US008128269B2

(12) United States Patent
Boyadjieff

(10) Patent No.: US 8,128,269 B2
(45) Date of Patent: Mar. 6, 2012

(54) SMOKE ENVIRONMENT PERSONNEL IDENTIFICATION APPARATUS

(76) Inventor: George I. Boyadjieff, Villa Park, CA (US)

( * ) Notice: Subject to any disclaimer, the term of this patent is extended or adjusted under 35 U.S.C. 154(b) by 352 days.

(21) Appl. No.: 12/583,390

(22) Filed: Aug. 20, 2009

(65) Prior Publication Data

US 2010/0052875 A1 Mar. 4, 2010

Related U.S. Application Data

(60) Provisional application No. 61/190,696, filed on Aug. 29, 2008.

(51) Int. Cl.
*G02B 5/02* (2006.01)
*G08B 21/12* (2006.01)

(52) U.S. Cl. ..................... 362/558; 362/555; 362/217.1; 362/103; 362/108; 362/84; 340/306; 340/321; 340/573.1; 340/815.42; 340/815.45

(58) Field of Classification Search .................. 340/321, 340/332, 306, 573, 1, 815.42, 815.45; 362/103–108, 362/555, 558, 570, 217.1, 84
See application file for complete search history.

(56) References Cited

U.S. PATENT DOCUMENTS

| | | | | |
|---|---|---|---|---|
| 5,414,405 | A | 5/1995 | Hogg et al. | |
| 5,633,623 | A * | 5/1997 | Campman | 340/321 |
| 6,016,099 | A * | 1/2000 | Campman | 340/321 |
| 6,030,089 | A | 2/2000 | Parker et al. | |
| 6,310,552 | B1 | 10/2001 | Stumberg et al. | |
| 6,934,571 | B2 | 8/2005 | Wiesmann et al. | |
| 7,218,241 | B2 * | 5/2007 | Kessel et al. | 340/815.45 |
| 7,315,037 | B1 | 1/2008 | Page et al. | |
| 7,394,387 | B2 * | 7/2008 | Noonchester | 340/573.1 |
| 7,874,691 | B2 | 1/2011 | Kormos | |
| 2004/0050384 | A1 * | 3/2004 | Stein et al. | 128/200.23 |
| 2007/0281745 | A1 * | 12/2007 | Parkulo et al. | 455/557 |
| 2007/0291473 | A1 * | 12/2007 | Traynor | 362/106 |
| 2008/0170382 | A1 | 7/2008 | Mass et al. | |
| 2009/0070967 | A1 * | 3/2009 | Gonzalez | 24/16 R |
| 2010/0300436 | A1 * | 12/2010 | McKeown | 128/202.13 |
| 2011/0134657 | A1 * | 6/2011 | Hathaway | 362/555 |

* cited by examiner

*Primary Examiner* — George Bugg
*Assistant Examiner* — Anne Lai
(74) *Attorney, Agent, or Firm* — Gordon K. Anderson

(57) ABSTRACT

The apparatus consists of a self contained lighting and identification device (10) having a strap (104) for attachment to a SCBA tank. A back plate (58) and a front shield (62) are spaced apart forming a cavity for LED back-lighting, with the front shield incorporates identification indicia (68) which provides recognition of a specific firefighter. Battery containing tubes (72) act as structural pillars and are located between an upper end cap assembly (20) and a lower end cap assembly (86), utilizing tie rods (96) for attachment therebetween. Diffused light distribution tubes (78) energized by LED's are positioned adjacent to the battery tubes evenly dispersing light on each side of the apparatus, effectively penetrating a smoke environment. The upper end cap assembly incorporates a printed circuit board (46) which includes the necessary control and lighting devices, and the lower end cap has a removable bottom cover (90) allowing batteries to be replaced.

17 Claims, 4 Drawing Sheets

SMOKE ENVIRONMENT PERSONNEL IDENTIFICATION APPARATUS

CROSS REFERENCE TO RELATED APPLICATION

This application claims priority to and the benefit of U.S. Provisional Application No. 61/190,696, filed Aug. 29, 2008.

TECHNICAL FIELD

The present invention relates to personnel identification in general. More specifically to a self contained apparatus that provides individual, firefighters, fire departments, fire fighting companies, specialties and rank identification in smoke environments.

BACKGROUND ART

Previously, many types of identification devices and systems have been used in endeavoring to provide an effective means to identify individuals in a work or recreational environment under dark conditions.

The prior art listed below did not disclose patents that possess any of the novelty of the instant invention; however the following U.S. patents are considered related:

| Pat. No. | Inventor | Issue Date |
|---|---|---|
| 5,414,405 | Hogg et al. | May 9, 1995 |
| 6,030,089 | Parker et al. | Feb. 29, 2000 |
| 6,310,552 B1 | Stumberg et al. | Oct. 30, 2001 |
| 6,934,571 B2 | Wiesmann et al. | Aug. 23, 2005 |
| 7,315,037 B1 | Page et al. | Jan. 1, 2008 |

Patent Publication Document

| Publication Number | Inventor | Pub. Date |
|---|---|---|
| WO 2007/097678 A1 | Kormos | Aug. 30, 2007 |
| 2008/0170382 A1 | Mass et al. | Jul. 17, 2008 |

Hogg et al. in U.S. Pat. No. 5,414,405 teaches an identification device employing an IR LED contained within a housing which is carried by a person to be identified in dark conditions. The housing enables it to have a stick-on capability whereby the housing is configured be attached to the clothing of a wearer. The IR LED flashes and may be coded in a specific sequence enabling the wearer to be identified.

U.S. Pat. No. 6,310,552 B1 issued to Stumberg et al. is for a system allowing a firefighter to monitor safety related parameters during firefighting activities through audible and/or visual means. The system monitors pressure in the breathing system and ambient temperature along with motion. An audible alarm is activated to indicate a potential emergency situation relating to low remaining air time, impending thermal breakthrough and of lack of motion of the firefighter.

Wiesmann et al. in U.S. Pat. No. 6,934,571 B2 discloses a self contained breathing apparatus (SCBA) mask incorporating a series of physiologic sensors. A processor associated with a transmitter monitors groups of individuals wearing the SCBA masks. The status of several individuals in a hazardous environment may be monitored at once and their situation known over a period of time.

Page et al. in U.S. Pat. No. 7,315,037 B1 teaches an infrared identification device including a light emitting panel receiving light from an infrared light source for conduction within the panel and emission from a surface on one side of the panel making it easy to detect at night when viewed through night vision equipment. The device functions in an interrogation mode allowing activation remotely by a signal or code and return a signal response.

PCT Patent Publication No. WO 2007/097678 A1 issued to Kormos discloses a light emitting device adapted to be attached to at least one air cylinder carried by a scuba or smoke diver. The device consists of an electroluminescent filament and a protective cover enclosing the filament which is made of translucent heat resistant silicone material. The light emitting device has resilient fastening elements arranged to secure the device to air cylinders.

Mass et al. in U.S. patent application publication 2008/0170382 A1 discloses an illuminated safety helmet used during sporting events and occupations, such as fire fighters, construction workers and oil field employees. The helmet includes LED's providing alternating sources of intense light to better locate the helmet. The LED's may be adjusted to increase brightness or blinking time to provide better visibility in current conditions.

For background purposes and as indicative of the art to which the invention is related reference may be made to the remaining cited U.S. Pat. No. 6,030,089 issued to Parker et al.

DISCLOSURE OF THE INVENTION

This invention relates generally to an apparatus for identification of individual firefighters while working in a dense smoke environment since firefighting personnel are commonly surrounded by dense smoke while fighting fires. This condition can be aggravated when fighting fires in an enclosed structure and/or during the night time. Personnel can become disoriented in such conditions and may even become lost. Additionally when fighting fires in buildings, structures may collapse upon the firefighters and trap them inside while the building is still burning. There have been numerous cases where firefighting personnel have lost their lives due to these hazardous conditions.

Fire departments are gravely concerned about the potential loss of life and injury resulting from disorientation and from being trapped and cannot be located due to the dense smoke environment. The fire term used to describe prevention of such events is called "location accountability".

There has been a long felt need for an apparatus that will assist in providing this location accountability. Accordingly, the invention makes available a novel apparatus that is entirely suitable for locating and identifying a firefighter in this dense smoke environment.

It is therefore the primary object of the invention to provide a novel effective visual method of locating firefighting personnel working in dense smoke.

It is another object of the invention to provide an apparatus that can be attached to an individual firefighter in such a manner that the apparatus can easily be seen through dense smoke by other firefighting personal permitting visual location of the wearer of the apparatus. This object is accomplished by attaching the device to a self contained breathing apparatus (SCBA) air tank by simply snapping the attached spring steel band or other fastening methods over the tank on an outside surface which requires no modification to the tank in any way.

It is still another object of the invention to provide visual location of the light source wearer from a distance which is achieved by the use of newly developed diffused light distribution tubes. The tubes are mounted one on each vertical side of the device both employing a single light emitting diode (LED) for their light source. This light distribution tube dispenses the emitted light uniformly throughout almost the entire length of the apparatus forming an easily visualized broad beam as it illuminates the smoke particles on each side of the wearer creating an easily seen image. Extensive testing has been conducted to find the ideal color of the LED for this application with red and amber being the preeminent candidates however the red was found slightly superior therefore preferred.

It is yet another object of the invention to distinguish one fire fighting company from another and specifically differentiate the type of personnel, such as medical, search and rescue, rank and other specialties. This object is achieved utilizing a specialized light source in the form of a tri-color LED that illuminates an internal cavity covered with a shield upon which indicia, in the form of unique letters and numbers, are cutout or otherwise rendered transparent and positioned at the front of the apparatus using the light source to backlight this indicia. Primary colors are used which maximize distance visualization in dense smoke with the color of the light selectable for the purpose of using different colors to identify separate fire fighting organizations and/or different categories of fire fighting personnel.

An important object of the invention is to employ a method of energizing the lighting in the apparatus without requiring manual operation of a switch. This object eliminates training the firefighting personnel to turn on a switch when the SCBA equipment is utilized, which may easily be neglected during an emergency situation. A magnetic switch is incorporated in the apparatus for turning on the device by simply detaching a magnet that adheres to the device. The magnet is attached to a lanyard which in turn is attached to the SCBA storage compartment located in the fire fighting vehicle. When a firefighter exits the vehicle with the SCBA unit, the device is automatically turned on as the magnet stays in the compartment with the lanyard.

A final object of the invention is in the flexibility of the apparatus to have the front shield changed or replaced by simply sliding it from a groove in the upper end cap and lower end cap. This feature is particularly useful when a new person or a change in the organization requires a different identification number or letter.

These and other objects and advantages of the present invention will become apparent from the subsequent detailed description of the preferred embodiment and the appended claims taken in conjunction with the accompanying drawings.

BEST MODE FOR CARRYING OUT THE INVENTION

The best mode for carrying out the invention is presented in terms of a preferred embodiment of a self contained smoke environment personnel lighting and identification apparatus or device 10 which includes a strap for attachment to a SCBA tank, a battery powered back-lighted front shield having identification indicia providing recognition of a specific firefighter, and a plurality of battery powered lights emitting light through diffused light distribution tubes for illumination in a dense smoke environment.

Figure 1:
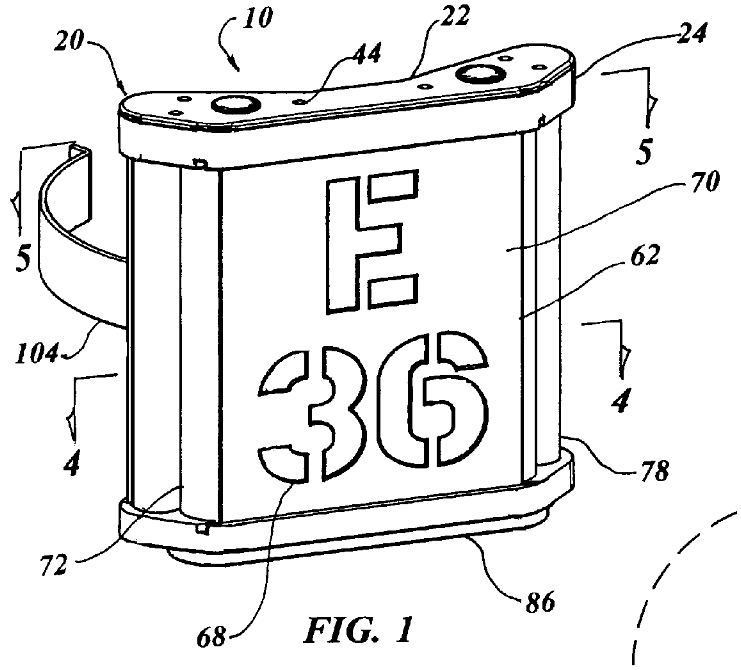
FIG. 1 is a partial isometric view of the smoke environment personnel identification apparatus in the preferred embodiment.
Figure 2:
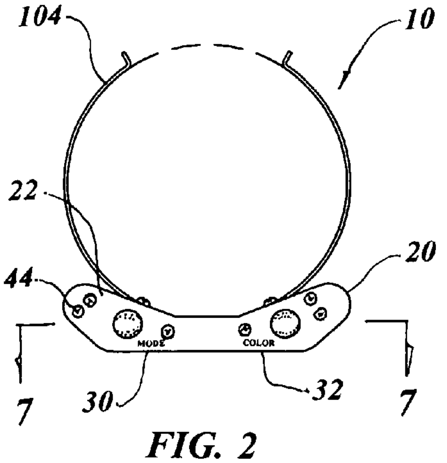
FIG. 2 is a plan view of the apparatus mounted on a SCBA air tank with the tank shown with dashed lines as it is not part of the invention.

This preferred embodiment 10 is shown in FIGS. 1 thorough 9 and is comprised of an upper end cap assembly 20 consisting of an upper end cap top cover 22 and an upper end cap body 24, as illustrated in FIGS. 1-3, 5, 7, and 8. The upper end cap top cover 22 preferably has a plurality of control switch holes 26 each having a switch sealing rubber boot 28. Each boot 28 preferably having a different color, such as one a blue color and an adjacent marking on the top surface of the top cover 22 designating “MODE” 30 and the other red color marked on the top cover 22 designating “COLOR” 32 as illustrated in FIG. 2. The MODE and COLOR designations may be formed into the upper end cap top cover 22 as raise or recessed imprints or each have a separate nameplate provided.

The upper end cap body 24 contains a plurality of light distribution tube recessed indentations 34, battery tube recessed sockets 36, battery contacts 38, at least two tie-rod holes 40 and a flared opening 42 for light illumination beneath. The indentations 34, sockets 36, battery contacts 38 may be formed of any number and/or combination, however one on each half with a total of two are preferred, as illustrated in FIGS. 4, 5, 7 and 8. The upper end cap top cover 22 and an upper end cap body 24 may be attached together in any acceptable manner, however, attachment with self tapping screws 44 is preferred.

The most practical manner of fabrication of the upper end cap top cover 22 and the upper end cap body 24 is injected molding which is formed from a material consisting of acrylic, allyl diglycol carbonate, polycarbonate, polystyrene, polysulfone, polyester sulfone or polyester or the like, with a black color preferred.

Figure 9:
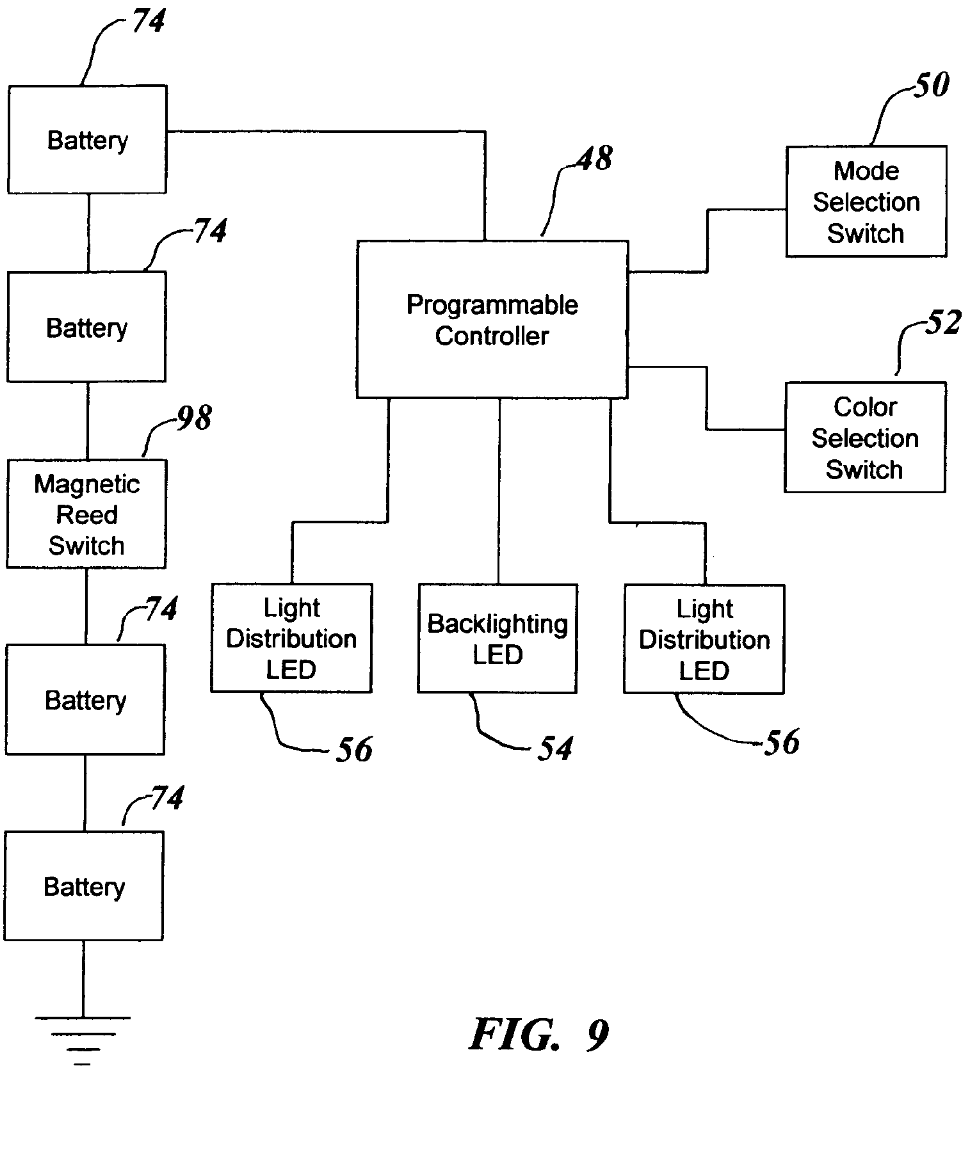
FIG. 9 is a block diagram of the circuitry of the printed circuit board

A printed circuit board 46 is juxtaposed between the upper end cap top cover 22 and the upper end cap body 24, with the printed circuit board 46 having control and lighting devices, light positioning restraints, electric source interfaces and interconnecting control circuits as illustrated in the block diagram of FIG. 9.

These control and lighting devices include, but are not limited to, a programmable controller 48, a least one operational mode selection switch 50, at least one backlighting color selection switch 52, at least one backlighting multicolor LED 54, for illuminating the cavity behind a front shield, and a plurality of light distribution tube LED’s 56, preferably red in color. The mode selection switch 50 controls the LED mode of operation including continuous lighting, flashing lighting and strobe lighting. Preferably the backlighting multi-color light emitting diode LED 54 is the tricolor type utilizing red, green and blue and any combination thereof for the color differentiation which is elected by the color selection switch 52 which along with indicia identifies a particular firefighting company/organization or the type of personnel, such as medical, search and rescue, rank and other specialties. Other solid state devices, traces and contact points are included in the printed circuit board 46 for operation of the LED's.

Figure 4:
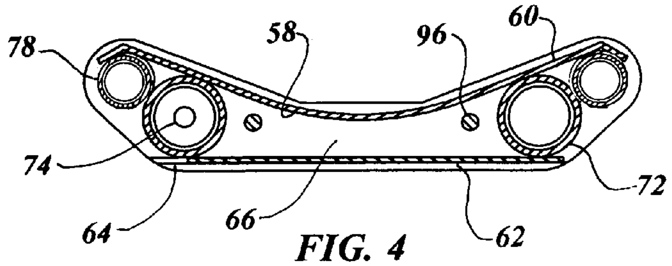
FIG. 4 is a cross sectional view taken along lines 4-4 of FIG. 1.

A back plate 58 is used as part of an enclosure and to provide a mounting surface for attachment purposes. The back plate 58 includes a top and a bottom with the top joined onto the upper end cap body 24 within a back plate recess 60 which is basically the same as illustrated in FIG. 4 except in mirror image for the upper end cap body 24. The back plate 58 is constructed of a material such as sheet metal, thermoplastic or fiberglass with sheet metal in the form of aluminum preferably painted white.

Figure 3:
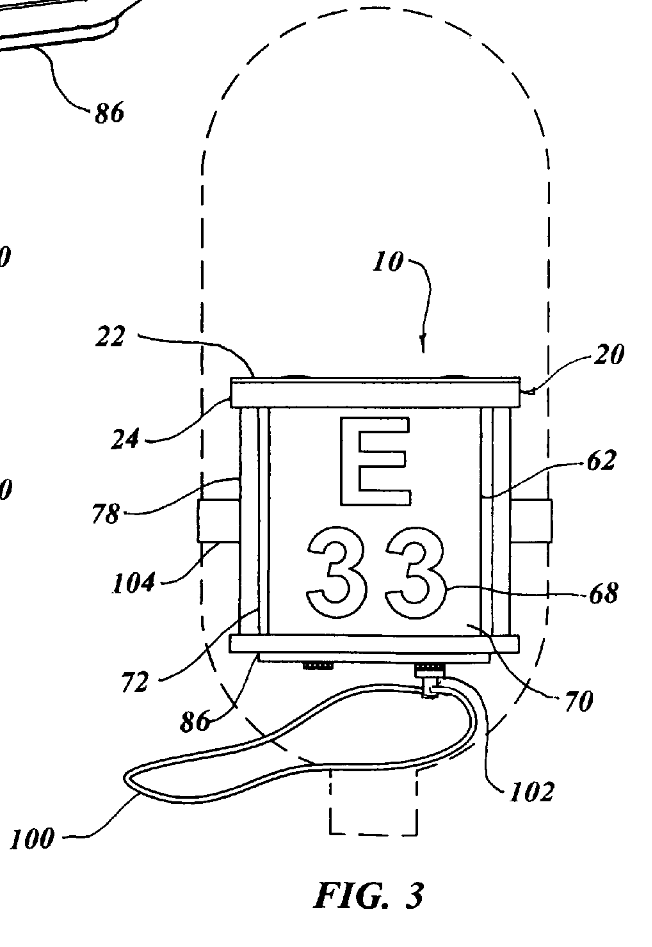
FIG. 3 is a front elevation view of the apparatus mounted on a SCBA air tank with the tank shown with dashed lines as it is not part of the invention.
Figure 6:
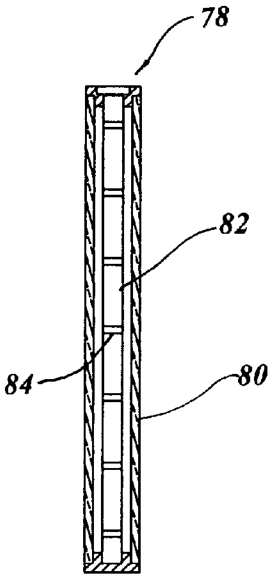
FIG. 6 is a cross sectional view of one of the diffused light distribution tubes taken along an imaginary centerline.
Figure 8:
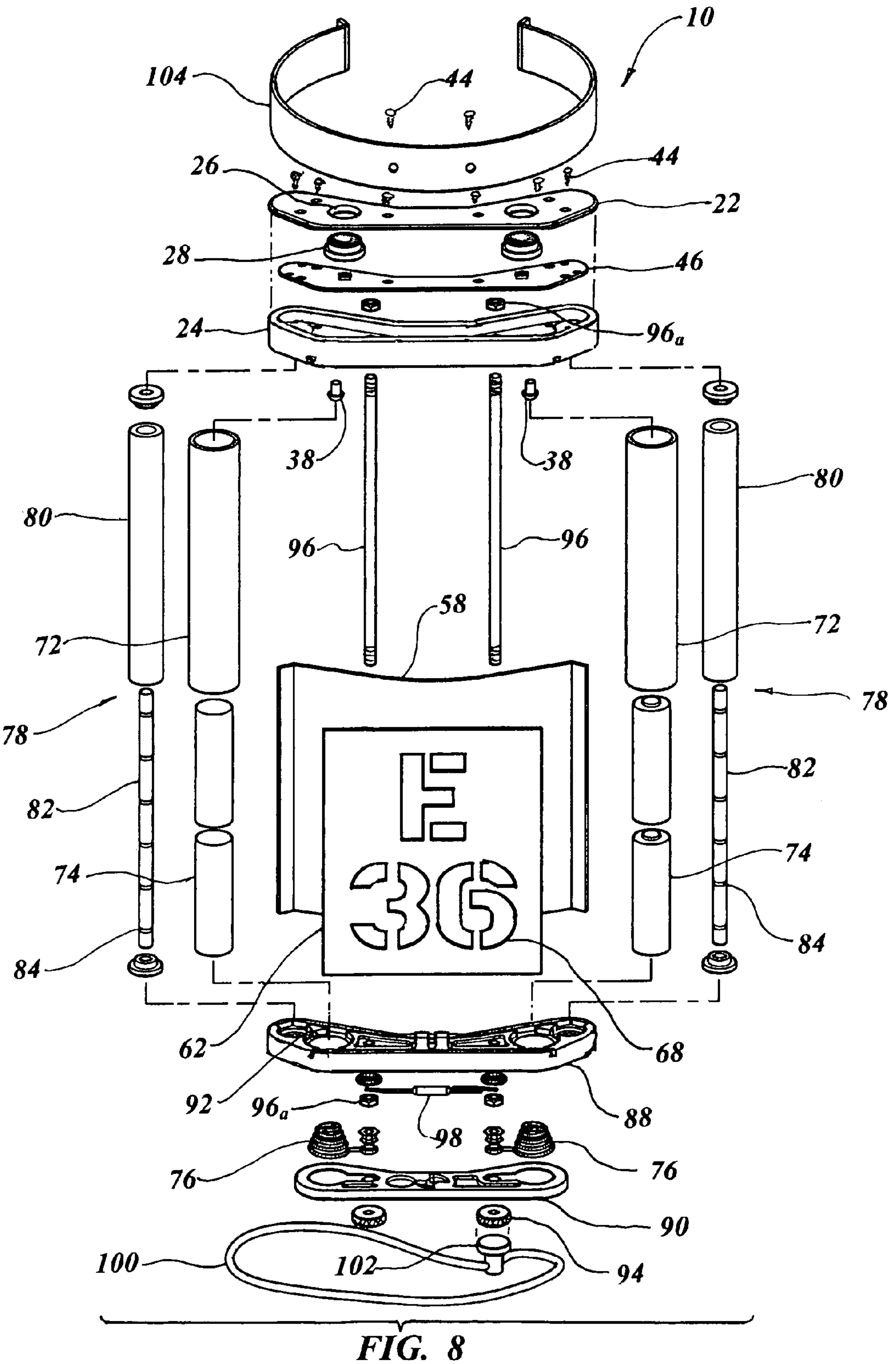
FIG. 8 is an exploded isometric view of the smoke environment personnel identification apparatus in the preferred embodiment.

A front shield 62 encloses the front of the apparatus 10 and likewise incorporates a top and a bottom with the top joined onto a front shield recess 64 in the upper end cap body 24, again basically the same as illustrated in FIG. 4 except in mirror image of the upper end cap body 24. The front shield 62 is spaced apart from the back plate 58 forming a cavity 66 therebetween which is used for back-lighting. The front shield 62 incorporates identification indicia 68 which provide recognition of a specific firefighter group etc. as shown in FIGS. 1, 3 and 8.

The front shield is 62 may be constructed from transparent thermoplastic material such as acrylic methyl methacrylate, polycarbonate, poly vinyl chloride, cellulose acetate butyrate, or polypropylene. The transparent thermoplastic material preferably includes a stratum of opaque silk screened coating 70, except with the identification indicia 68 remaining transparent, permitting backlighting illumination to be visible through the transparent area of the identification indicia 68. An alternate material and indicia 68 marking is a sheet metal plate of aluminum or steel with the indicia 68 die cut into the material leaving a recognizable unobstructed opening therethrough allowing light to disperse to atmosphere from the cavity 66 providing clear visibility in a smoke environment. In any event the entire cavity 66 is painted a reflective color with white being preferred to enhance the backlighting capabilities.

A number of battery tubes 72, preferably two, are retained within the upper end cap body 24 and form structural pillars to support separate parts of the apparatus. Each of the battery tubes 72 include at least two batteries 74 installed therein, as they have an inside diameter and length configured specifically for this purpose. Each battery is preferably the industry size AA rated at 1.5 volts, and at least one spiral compression spring 76 is positioned under each of the lower batteries. The battery tubes 72 are preferably formed of a thin wall metal such as aluminum or steel painted white. Alternately the battery tubes 72 may be made of a white thermoplastic.

Figure 5:
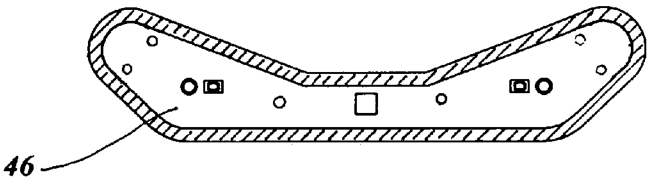
FIG. 5 is a cross sectional view taken along lines 5-5 of FIG. 1.
Figure 7:
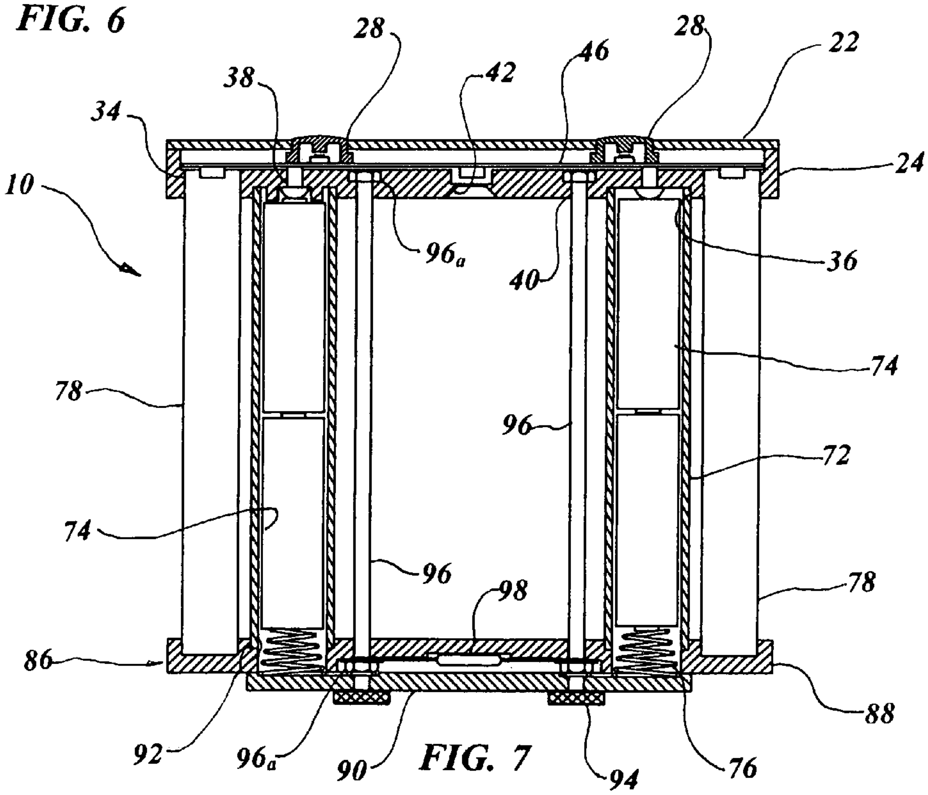
FIG. 7 is a cross sectional view taken along lines 7-7 of FIG. 2.

A number of diffused light distribution tubes 78, preferably two, are retained within the light distribution tube indentions 34 of the upper end cap body 24 and are positioned adjacent to the battery tubes 72, as shown in FIGS. 4, 5 and 7. The distribution tubes 78 evenly disperse light emitted from the light distribution tube LED contained within the printed circuit board 46 which effectively penetrate a smoke environment on opposite sides of the apparatus 10. The diffused light distribution tubes 78 each consist of an outer semi-transparent flexible plastic tube 80 with inner plastic rod 82 having a series of textured rings 84 that provide point light sources emitting from the inner plastic rod 82 as well as dispersing light rays throughout the entire length of the light distribution tubes 78.

These newly created diffused light distribution tubes 78 were developed by Kevin Hathaway and are presently afforded the patent pending status produced by an application filed for a non-provisional patent. The novelty of these light distribution tubes 78 is that they emit a uniform amount of light over their entire length from top to bottom and therefore have been selected for this application within the smoke environment.

A lower end cap assembly 86 completes the outer structure of the apparatus 10 and consists of a lower end cap body 88 and a lower end cap bottom cover 90. The lower end cap body 88 interfaces with the back plate 58, the front shield 62, the battery tubes 72 and the light distribution tubes 78 with the back plate 58 mounted in the back plate recess 60 of the lower end cap body 88, as illustrated in the exploded view of FIG. 8.

The front shield 62 slides into the front shield recess 64 permitting easy replacement. The light distribution tubes 78 fit into the indentations 34 and the battery tubes 72 fit into stepped battery sockets 92 in the lower end cap body 88 in alignment with the recessed sockets 36 of the upper end cap body 24. The recessed battery sockets 92 have an open bottom such that the battery tubes 72 are retained on a recessed shelf with the bottom open permitting the batteries 74 to be replaced by simply removing the bottom cover 90.

The lower end cap bottom cover 90 is removable by unscrewing two knurled finger nuts 94, as shown in FIGS. 7 and 8. The lower end cap body 88 and lower end cap cover 90 are preferably injected molded and formed of a material such as acrylic, allyl diglycol carbonate, polycarbonate, polystyrene, polysulfone, polyester sulfone, polyester or the like.

Attachment of the upper end cap assembly 20 to the lower end cap assembly 86 consists of two or more tie rods 96 forcing the upper and lower end cap assemblies 20 and 86 to tightly nest together between the structural battery tubes 72, as shown in FIG. 7. The tie rods 96 have a nut 96, positioned on each end and the additional knurled finger nut 94 is attached to remaining threads on the tie rods 96 beneath the lower end cap bottom cover 90.

A magnetic reed switch 98 is positioned in electrical contact between the pair of 74 batteries in each battery tube 72, as depicted in FIGS. 7 and 8. A lanyard 100 is configured to be readily attachable to an emergency fire fighting vehicle with a magnet 102 attached to the lanyard 100 held fast by magnetism to the knurled finger nut 94. When the apparatus 10 is removed from the emergency fire fighting vehicle, the magnet 102 is disengaged from the knurled finger nut 94 and the reed switch 98 is energized, automatically providing electrical power for operation of the lighting and identification features without the necessity of manually activating a switch. When the apparatus 10 is returned to the vehicle the magnet 102 is again attached thereby disengaging all of the electrical power.

As the apparatus 10 is designed to be carried in a smoke environment by fire fighters, the ideal location is mounting directly to the exposed surface of the SCBA tank which is provided by one or more straps 104 fastened to the tank, as shown pictorially in FIG. 3. The preferred method is using a single spring steel band formed in a C shape capable of being snapped onto the periphery of the SCBA tank. This form of the band strap 104 incorporates a reverse angular bend on each distal end for assistance in snapping the band over the tank. Alternatively a resilient cover could be used on the ends for the same purpose. There are many other viable attachment methods known in the art such as at least one or more flexible straps with a quick release buckles or detachable hook and loop tape fastened with pressure sensitive adhesive to the back plate 58 on one side and the SCBA tank on the other.

When the apparatus 10 is stored, the magnet 102 on the lanyard 100 is attached to the knurled finger nut 94 disengaging the lights and controls. In use the apparatus 10 is snapped over the SCBA tank and placed in the fire fighting vehicle with the lanyard 100 connected to a fixed portion of the vehicle's storage compartment. When required for use the firefighter removes the SCBA tank from the vehicle compartment leaving the lanyard 100 and magnet 102 attached which automatically turns on the controls and lights. When finished the magnet 102 is reattached shutting down the apparatus 10. It will be noted that if a different mode or color is desired, the change is easily accomplished with the switches 50 and 52 located on the upper end cap assembly 20.

While the invention has been described in complete detail and pictorially shown in the accompanying drawings, it is not to be limited to such details, since many changes and modifications may be made to the invention without departing from the spirit and scope thereof. Hence, it is described to cover any and all modifications and forms which may come within the language and scope of the appended claims.

Element Designation (For convenience of the Examiner, not part of the specification)

| | |
|---|---|
| 10 | self contained lighting and identification device |
| 20 | upper end cap assembly |
| 22 | upper end cap top cover |
| 24 | upper end cap body |
| 26 | control switch holes (in 22) |
| 28 | rubber boot |
| 30 | mode marking (on 22) |
| 32 | color marking (on 22) |
| 34 | light distribution tube indention (on 24 & 88) |
| 36 | battery tube recessed socket (in 24) |
| 38 | battery contact |
| 40 | tie rod hole |
| 42 | flared opening |
| 44 | self tapping screw (in 24) |
| 46 | printed circuit board |
| 48 | programmable controller (on 46) |
| 50 | mode selection switch (on 46) |
| 52 | color selection switch (on 46) |
| 54 | backlighting multi-color LED (on 46) |
| 56 | light distribution tube LED (on 46) |
| 58 | back plate |
| 60 | back plate recess (in 24 & 88) |
| 62 | front shield |
| 64 | front shield recess (in 24 & 88) |
| 66 | cavity (between 58 and 62) |
| 68 | identification indicia |
| 70 | silk screen coating |
| 72 | battery tube |
| 74 | battery |
| 76 | spiral compression spring |
| 78 | diffused light distribution tube |
| 80 | plastic tube (of 78) |
| 82 | inner plastic rods (in 80) |
| 84 | plastic ring (adjacent to 82 in 80) |
| 86 | lower end cap assembly |
| 88 | lower end cap body |
| 90 | lower end cap bottom cover |
| 92 | stepped battery socket (in 88) |
| 94 | knurled finger nut |
| 96 | tie rod |
| $96_a$ | nut (on 96) |
| 98 | magnetic reed switch |
| 100 | lanyard |
| 102 | magnet |
| 104 | strap |

The invention claimed is:

1. A smoke environment personnel identification apparatus which comprises:

an upper end cap assembly, consisting of an upper end cap top cover and an upper end cap body, wherein said upper end cap top cover having a plurality of control switch holes therein, wherein said upper end cap body having a plurality of light distribution tube recessed indentations, a plurality of battery tube recessed sockets, a plurality of battery contacts, at least two tie-rod holes and a flared opening for light illumination within the cavity between the back plate and the front shield, a printed circuit board juxtaposed between the upper end cap top cover and the upper end cap body, with the printed circuit board having control and lighting devices, light positioning restraints, electric source interfaces and interconnecting control circuits, a back plate having a top and a bottom with the top joined onto the upper end cap body, a front shield having a top and a bottom with the top joined onto the upper end cap body, spaced apart from the back plate having portions defining a cavity therebetween for back-lighting, with the front shield having identification indicia which provides recognition of a specific firefighter, a plurality of battery tubes retained within the upper end cap body forming structural pillars, with each of the battery tubes having a plurality of batteries therein, a plurality of diffused light distribution tubes retained within the upper end cap body and positioned adjacent to said battery tubes, for evenly dispersing light from the lighting devices within the printed circuit board for effectively penetrating a smoke environment, a lower end cap assembly consisting of a lower end cap body and a lower end cap bottom cover, with the lower end cap body interfacing with the back plate, front shield, battery tubes and light distribution tubes and the lower end cap bottom cover removable permitting the batteries within the battery tubes to be replaced, and means for attaching the upper end cap assembly to the lower end cap assembly thereby forming the smoke environment personnel identification apparatus.

2. The smoke environment personnel identification apparatus as recited in claim 1 further comprising a plurality of rubber boots each disposed within one of the upper end cap top cover control switch holes.

3. The smoke environment personnel identification apparatus as recited in claim 1 wherein said upper end cap top cover and a upper end cap body are injected molded and formed of a material selected from the group consisting of acrylic, allyl diglycol carbonate, polycarbonate, polystyrene, polysulfone, polyester sulfone and polyester.

4. The smoke environment personnel identification apparatus as recited in claim 1 wherein said printed circuit board further comprises a programmable controller, a least one operational mode selection switch, at least one backlighting color selection switch, at least one backlighting multi-color light emitting diodes (LED's) for illuminating the cavity behind the front shield, and a plurality of light distribution tube light emitting diodes (LED's).

5. The smoke environment personnel identification apparatus as recited in claim 1 wherein said back plate constructed of a material selected from the group consisting of sheet metal, thermoplastic and fiberglass.

6. The smoke environment personnel identification apparatus as recited in claim 1 wherein said front shield is constructed from transparent thermoplastic material selected from the group consisting of acrylic methyl methacrylate, polycarbonate, poly vinyl chloride, cellulose acetate butyrate, and polypropylene.

7. The smoke environment personnel identification apparatus as recited in claim 6 wherein said transparent thermoplastic material contains a stratum of opaque silk screened coating except with said identification indicia remaining transparent, permitting backlighting illumination to be visible through the identification indicia.

8. The smoke environment personnel identification apparatus as recited in claim 1 wherein said battery tubes having an inside diameter and length configured to retain at least one battery.

9. The smoke environment personnel identification apparatus as recited in claim 1 wherein said plurality of batteries comprise an industry size AA rated at 1.5 volts, and at least one compression spring positioned between at least one distal battery and said lower end cap bottom end cover.

10. The smoke environment personnel identification apparatus as recited in claim 1 wherein said diffused light distribution tubes each further comprise an outer semi-transparent flexible plastic tube with a plurality of inner plastic rods and a joint light source plastic ring interfaced between each plastic rod thereby dispersing light rays throughout the entire length of the light distribution tubes.

11. The smoke environment personnel identification apparatus as recited in claim 1 wherein said lower end cap body and said lower end cap cover are injected molded and formed of a material selected from the group consisting of acrylic, allyl diglycol carbonate, polycarbonate, polystyrene, polysulfone, polyester sulfone and polyester.

12. The smoke environment personnel identification apparatus as recited in claim 1 further comprising a least one strap fastened to the apparatus for attachment to a self contained breathing apparatus (SCBA) tank.

13. The smoke environment personnel identification apparatus as recited in claim 12 wherein said strap fastened to the apparatus further comprises a spring steel band formed in a C shape capable of being snapped over the SCBA tank.

14. The smoke environment personnel identification apparatus as recited in claim 12 wherein said strap fastened to the apparatus is selected from the group consisting of at least one flexible strap with a quick release buckle, and detachable hook and loop tape fastened with pressure sensitive adhesive to said back plate on a first side, and the SCBA tank on a second side.

15. A smoke environment personnel identification apparatus which comprises:

an upper end cap assembly, consisting of an upper end cap top cover and an upper end cap body, a printed circuit board juxtaposed between the upper end cap top cover and the upper end cap body, with the printed circuit board having control and lighting devices, light positioning restraints, electric source interfaces and interconnecting control circuits, a back plate having a top and a bottom with the top joined onto the upper end cap body, a front shield having a top and a bottom with the top joined onto the upper end cap body, spaced apart from the back plate having portions defining a cavity therebetween for back-lighting, with the front shield having identification indicia which provides recognition of a specific firefighter, a plurality of battery tubes retained within the upper end cap body forming structural pillars, with each of the battery tubes having a plurality of batteries therein, a plurality of diffused light distribution tubes retained within the upper end cap body and positioned adjacent to said battery tubes, for evenly dispersing light from the lighting devices within the printed circuit board for effectively penetrating a smoke environment, means for attaching the upper end cap assembly to the lower end cap assembly thereby forming the smoke environment personnel identification apparatus, wherein said means for attaching the upper end cap assembly to the lower end cap assembly further comprises at least two tie rods drawing the upper end cap assembly to the lower end cap assembly together, between the plurality of battery tubes with the tie rods each having a nut on each end and an additional knurled finger nut beneath the lower end cap bottom cover.

16. The smoke environment personnel identification apparatus as recited in claim 15 further comprising a magnetic reed switch positioned in electrical contact between said pluralities of batteries.

17. The smoke environment personnel identification apparatus as recited in claim 16 further comprising a lanyard, having a configuration readily attachable to an emergency fire fighting vehicle, with a magnet attached to the lanyard held fast by magnetism to a knurled finger nut, such that when the smoke environment personnel identification apparatus is removed from the emergency fire fighting vehicle, the magnet is disengaged from the knurled finger nut energizing the reed switch, providing electrical power for lighting and identification operation.

* * * * *